United States Patent Office 3,449,240
Patented June 10, 1969

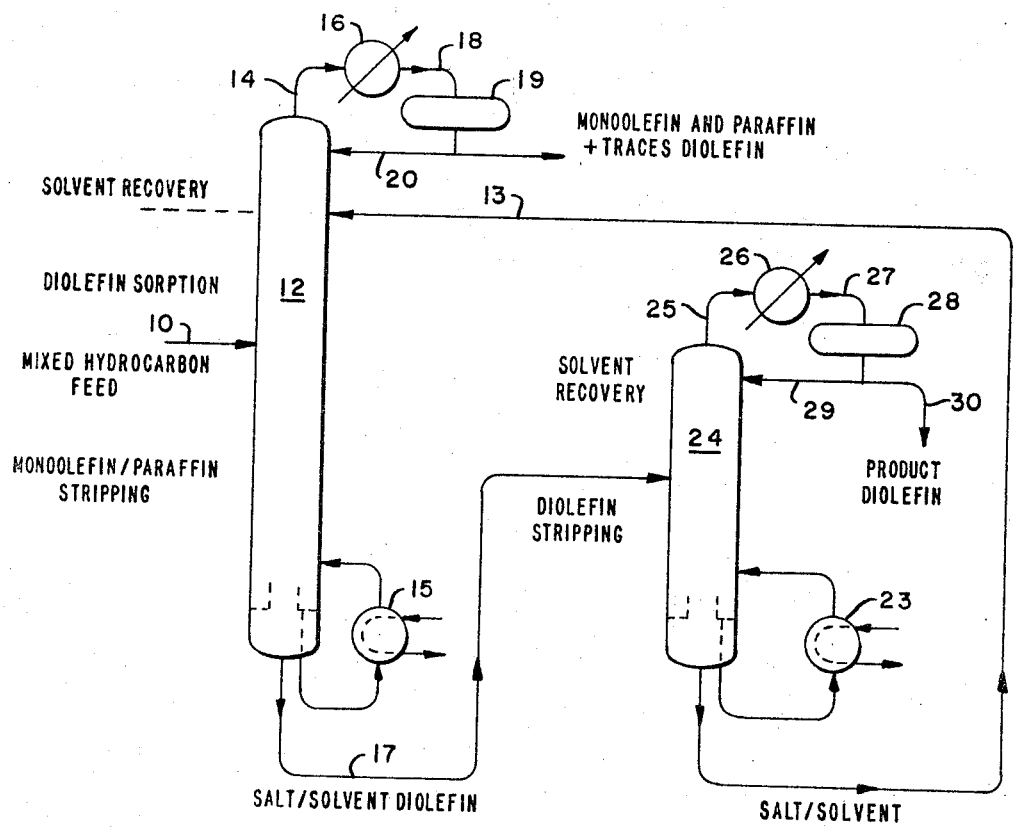

3,449,240
OLEFIN SEPARATION BY COPPER
SULPHATE COMPLEXING
George C. Blytas, Kensington, Edward R. Bell, Lafayette, and Arthur K. Dunlop, Berkeley, Calif., assignors to Shell Oil Company, New York, N.Y., a corporation of Delaware
Continuation-in-part of application Ser. No. 530,476, Feb. 28, 1966. This application May 23, 1968, Ser. No. 731,565
Int. Cl. B01d 11/04; C07c 7/16
U.S. Cl. 208—308       3 Claims

ABSTRACT OF THE DISCLOSURE

Separation of olefinically unsaturated hydrocarbons from hydrocarbons of lesser degrees of unsaturation is effected with an anhydrous solution of cuprous sulfate in propionitrile.

CROSS-REFERENCE TO RELATED APPLICATION

This application is a continuation-in-part of copending application Serial No. 530,476, filed February 28, 1966, now Patent No. 3,401,112.

BACKGROUND OF THE INVENTION

Field of the invention.—It has long been known that olefins react with aqueous or non-aqueous solutions of metal salts of the elements found in Group IB, IIB and VIII of the Periodic Table of Elements (as found in Lange's Handbook of Chemistry, 9th ed., 1956, pages 56–57). Among the most active metal ions to form such complexes are Cu(I), Ag(I), Hg(II), Rh(I), Ni(II), Pd(II). However, of these materials, the platinum group metals are prohibitively expensive for use in a commercial process; nickel gives complexes only under special conditions; and mercury complexes are highly transitory, since they result in the formation of actual $\sigma$-bonded organo-mercury compounds. With silver and copper, the problem is primarily one of attaining chemical stability without interfering too seriously with the complexing abilities of the respective ions. The silver ion tends to be reduced to metallic silver, whereas the cuprous ion tends to be oxidized to the cupric state or disproportionate to the cupric ion and metallic copper (Equation I).

$$2Cu^+ = Cu + Cu^{++} \qquad (I)$$

In aqueous media the disproportionation of cuprous copper (Equation I) is particularly acute because the disproportionation reaction is enhanced by the greater stability of aquo-cupric complexes, e.g., $Cu(H_2O)_4^{++}$, vis-a-vis aquo-cuprous complexes, e.g., $Cu(H_2O)_2^+$. Thus, the cuprous copper concentration in an aqueous medium is severely limited, consequently limiting the formation of cuprous-olefin complexes.

Known processes using aqueous media therefore generally employ complexing agents such as ammonia, pyridine, or alkanolamines together with inorganic salts such as sodium chloride or ammonium chloride to increase the stability of the cuprous copper. However, the use of such complexing agents lowers the capacity of the cuprous salt solution for complexing olefins because the olefins must compete with the complexing agents for the cuprous copper. Moreover, most aqueous cuprous copper solutions have the additional disadvantage of being able to dissolve only small quantities of most cuprous salts.

Description of the prior art.—In order to overcome some of the disadvantages inherent in olefin separations with aqueous cuprous salt solutions, U.S. 2,376,239 of Evans et al., issued May 15, 1945, has proposed the use of anhydrous cuprous salt solutions comprising nitrogen bases, e.g., amines, and alcohols. However, the capacity of such amine-alcohol solutions of cuprous salt are necessarily limited because (1) the strong ability of amines to complex with cuprous copper prevents appreciable formation of olefin-cuprous complexes and (2) the alcohols strongly solvate and stabilize cupric copper and thereby promote disproportionation of the cuprous copper to cupric copper. Accordingly, amine-alcohol solutions of cuprous salts are satisfactory for separation of lower olefins, e.g., ethylene, from saturated hydrocarbons but are unsatisfactory for higher olefins since the stability of olefin-cuprous complexes varies inversely with the length or branching of the chain.

U.S. 2,275,135 of Fasce, issued March 3, 1942, has also proposed the use of an anhydrous solution of cuprous copper in ethylene glycolacetonitrile. But his solvent system also suffers from the distinct disadvantage of requiring a hydroxylic compound which tends to decrease the stability of the cuprous copper. The use of acetonitrile alone, however, is not satisfactory by virtue of the facts that most cuprous salts are not sufficiently soluble therein to provide adequate capacity for olefin absorption and that some cuprous salts form insoluble complexes with acetonitrile. For example Hathaway et al., J. Chem. Soc. 3215 (1961), disclose that cuprous tetrafluoroborate, cuprous perchlorate and cuprous nitrate form solid complexes with acetonitrile.

SUMMARY OF THE INVENTION

It has now been found that the separation of olefinically unsaturated hydrocarbons from hydrocarbons of lesser degrees of unsaturation is effected by an anhydrous solution of cuprous sulfate in propionitrile. Not only is the solubility of cuprous sulfate considerably higher than that obtained in aqueous solutions, but the solubility of olefins in cuprous sulfate-propionitrile solutions is also considerably higher. For example, a saturated cuprous sulfate-propionitrile solution dissolves 20% by weight isoprene, while a saturated cuprous sulfate-pyridine-water solution dissolves only about 10% by weight of the same olefin. The combination of cuprous sulfate and propionitrile is particularly suitable for olefin separations in an extractive distillation process as the cuprous sulfate-propionitrile solution is extremely stable at elevated temperatures and contains up to 30% wt. cuprous copper.

BRIEF DESCRIPTION OF THE DRAWING

An application of the separation process in an extractive distillation is shown in the accompanying drawing. A stream 10 of a mixture of hydrocarbons containing $C_n$ diolefins, monoolefins and paraffins (e.g., isoprene, 2-methylbutene-2 and isopentane) is introduced as a vapor or as a liquid at just below its boiling point into an intermediate zone of a conventional extractive distillation tower 12. A selective solvent mixture, such as 25:75 by weight solution of cuprous sulfate in propionitrile, enters the tower adjacent its top through line 13, at approximately 30–50° C. Reboiler 15 supplies the heat necessary to the proper operation of the tower, and has high-pressure supersaturated steam as a source of heat. The tower is maintained at a pressure of 15–35 p.s.i.a. and at top and bottom temperatures of approximately 50–80° C. and 20–50° C., respectively. The feed stream is volatilized, and passes in the vapor state countercurrent to the descending solvent mixture stream which selectively extracts the diolefins and some monoolefin in the sorption zone and which is stripped of the monoolefin in the lower stripping zone to give a solvent extract. This extract is removed from the base of the tower 12 through line 17 and is passed into a solvent stripper 24. The raffinate vapor leaves the top of tower 12 via line 14 and passes through condenser 16 and line 18 into a receiver 19. A portion of the condensate collected in receiver 19 is returned as reflux through line 20 to the extractive distillation tower.

The solvent stripper 24 operates at a pressure of about 15–25 p.s.i.a., and at a temperature of approximately 80–120° C. Here, the diolefin leaves the solvent in an overhead vapor, and passes via line 25 through condenser 26 and line 27 into receiver 28. The condenser 26 is maintained at a temperature of about 20–45° C. The condensed diolefin is collected in receiver 28 and is recovered as product through line 30. A portion of the condensed diolefin is returned via line 29 as reflux to the stripper. The heat required to volatilize the diolefin is supplied through a reboiler 23 connected to the stripper. The diolefin-free solvent mixture is drawn off the bottom of stripper 24 through line 13, and is recycled via line 13 to the extractive distillation column 12.

DESCRIPTION OF PREFERRED EMBODIMENTS

In accordance with the present invention, a mixture of closely boiling hydrocarbons of different degrees of unsaturation is separated by selectively complexing a more highly unsaturated hydrocarbon with cuprous sulfate in propionitrile solvent, separating the complex from the uncomplexed hydrocarbons, and subsequently decomposing the complex to recover the hydrocarbon therefrom. The process of the invention is particularly advantageously employed for the separation of mixtures of closely boiling aliphatic hydrocarbons having from 2 to 10 carbon atoms, preferably 3 to 6 carbon atoms. Thus the process of the invention is particularly suitable for the separation of aliphatic diolefins from closely boiling aliphatic monoolefins and saturated hydrocarbons such as butadiene from butenes and butanes; isoprene from isoamylenes, n-pentenes, pentanes and the like; and hexadienes from hexenes and hexanes. In addition, the process of the invention is suitable for the separation of a mixture of butadiene-isoprene from a $C_4$–$C_5$ stream or for the separation of lower monoolefins of up to 6 carbon atoms from lower saturated hydrocarbons, e.g., propylene from propane and cyclopentene from cyclopentane.

The solution of cuprous sulfate in propionitrile is suitably prepared by simply dissolving cuprous sulfate of reasonable purity in propionitrile. Alternatively, cuprous sulfate-propionitrile solutions are conveniently prepared by contacting substantially stoichiometric amounts of cupric sulfate and metallic copper in propionitrile at elevated temperatures. The solutions of cuprous sulfate in propionitrile employed in the process of the invention contain from about 10% to about 30% by weight of cuprous copper.

Any suitable method of contacting the hydrocarbon mixture and the cuprous sulfate-propionitrile solution can be employed. A preferred procedure is to countercurrently contact the hydrocarbon mixture with the cuprous sulfate-propionitrile solution in an extractive distillation column as described in FIGURE I. The temperature employed in the extractive distillation varies from about 40° C. to about 100° C. and the pressure employed varies from about 10 p.s.i.a. to about 100 p.s.i.a. Useful hydrocarbon feed mixture to cuprous sulfate-propionitrile volume ratios range from about 0.75:1 to about 20:1. In general, the cuprous sulfate to propionitrile weight ratio varies from about 1:1 to about 1:5. It is generally preferred to effect the contacting of the cuprous copper solution and hydrocarbon feed in an inert, i.e., oxygen-free and substantially anhydrous, reaction environment.

To further illustrate the process of the invention, the following examples are provided. It should be understood that the details thereof are not to be regarded as limitations, as they may be varied as will be understood by one skilled in this art.

Example I

A hydrocarbon mixture of 62 parts by weight 2-methylbutene-2 and 38 parts by weight isoprene was equilibrated with 208 parts by weight of cuprous sulfate in 1004 parts by weight of propionitrile at 23° C. The vapor phase composition (on solvent free basis) was 91.84 parts by weight 2-methylbutene-2 and 8.12 parts by weight isoprene. The α-value for isoprene and 2-methylbutene-2, defined below in Equation II for the separation of two components A and B, was 6.85.

$$\alpha_{A,B} = \left(\frac{\text{Mole percent A in vapor}}{\text{Mole percent B in vapor}}\right)\left(\frac{\text{Mole percent B in liquid}}{\text{Mole percent A in liquid}}\right) \quad \text{(II)}$$

Example II

A hydrocarbon feed composed of 35% isoprene and 65% 2-methylbutene-2 is injected into an extractive distillation column countercurrent to a solvent mixture containing about 35% by weight cuprous sulfate in propionitrile, under the following operating conditions:

| | |
|---|---|
| Average column temperature, °C. | 58 |
| Average condenser tempertaure, °C. | 32 |
| Solvent/feed ratio | 11 |
| Average column pressure, p.s.i.g. | 10 |
| Reflux ratio | 2.2 |
| Isoprene stripping column reboiler temperature, °C. | 105–110 |
| Isoprene stripping column operating, p.s.i.g. | 5–10 |

Isoprene is recovered at a yield of 95% of the original isoprene in the feed and in a purity of more than 99%.

Example III

The cuprous copper content of saturated solutions of cuprous sulfate in a variety of solvents was determined at a temperature of 25° C. The method employed consisted determining the total soluble copper content ($Cu^+$ and $Cu^{++}$) by spectrophotometric analysis with "neocuprine" (2,3-dimethyl-1,10-penantholine) and separately determining the cupric copper alone content by reacting the cupric ion with an acidified iodine-solution to form iodine and titrating the iodine wth thosulfate soluton to a potentiometric end-point. The cuprous copper content was then determined by calculating the difference between total soluble copper and cupric ion concentration. The results are provided in the following table.

TABLE

| Expt. | Solvent | Percent wt. cuprous copper (based on total solution) |
|---|---|---|
| 1 | Propionitrile | 18 |
| 2 | Acetonitrile | 2.8 |
| 3 | p-xylene | <1 |
| 4 | Acetone | <1 |
| 5 | Tetrahydrofuran | <1 |

Example IV

By a procedure similar to Example III, a saturated solution of cuprous sulfate in propionitrile at 80° C. was found to contain over 26% wt. cuprous copper. In the absence of air, the cuprous copper content of this solution did not change on heating to 100–120° C. for up to 50 hours.

We claim as our invention:

1. The process of separating mixtures of closely boiling hydrocarbons consisting essentially of at least two hydrocarbons of different degrees of unsaturation by selectively complexing a more highly unsaturated hydrocarbon with cuprous sulfate in propionitrile under substantially anhydrous conditions and separating the non-complexed hydrocarbon in one phase from the resulting cuprous sulfate-hydrocarbon complex in a second phase.

2. The process of claim 1 wherein the mixture of hydrocarbons to be separated consists essentially of aliphatic hydrocarbons.

3. The process of claim 1 wherein the separation of the non-complexed hydrocarbon from the cuprous sulfate-hydrocarbon complex is conducted by extractive distillation at a temperature of from about 40° C. to about 100° C. and at a pressure of from about 10 p.s.i.a. to about 100 p.s.i.a.

References Cited

UNITED STATES PATENTS

| | | | |
|---|---|---|---|
| 2,246,257 | 6/1941 | Kohn | 208—324 |
| 2,275,135 | 3/1942 | Fasce | 60—681.5 |
| 2,429,134 | 10/1947 | Morrell et al. | 260—677 |
| 2,376,239 | 5/1945 | Evans et al. | 260—677 |

HERBERT LEVINE, *Primary Examiner.*

U.S. Cl. X.R.

208—324; 260—677, 681.5